(12) United States Patent
Modisett et al.

(10) Patent No.: US 9,671,006 B2
(45) Date of Patent: Jun. 6, 2017

(54) VEHICLE TRANSFER CASE ASSEMBLY WITH ONE-PIECE TORQUE-TRANSFER COMPONENT HAVING SPROCKET PORTION AND OUTPUT FLANGE PORTION

(71) Applicant: GM GLOBAL TECHNOLOGY OPERATIONS LLC, Detroit, MI (US)

(72) Inventors: William Marc Modisett, Waterford, MI (US); Gregory Sterba, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 188 days.

(21) Appl. No.: 14/533,140

(22) Filed: Nov. 5, 2014

(65) Prior Publication Data

US 2016/0123452 A1    May 5, 2016

(51) Int. Cl.
| | | |
|---|---|---|
| *B60K 17/344* | (2006.01) | |
| *F16H 55/30* | (2006.01) | |
| *F16H 57/021* | (2012.01) | |
| *F16H 7/06* | (2006.01) | |
| *F16H 55/06* | (2006.01) | |
| *B60K 23/08* | (2006.01) | |

(52) U.S. Cl.
CPC ............ *F16H 55/30* (2013.01); *B60K 17/344* (2013.01); *B60K 23/08* (2013.01); *F16H 7/06* (2013.01); *F16H 55/06* (2013.01); *F16H 57/021* (2013.01); *B60K 2023/0833* (2013.01); *B60K 2023/0858* (2013.01)

(58) Field of Classification Search
CPC .................. B60K 17/344; B60K 23/08; B60K 2023/0833; F16H 55/30
USPC ......................................................... 180/233
See application file for complete search history.

(56) References Cited

U.S. PATENT DOCUMENTS

| | | | | |
|---|---|---|---|---|
| 3,221,574 | A * | 12/1965 | Sampietro ............ | B60K 17/344 184/44 |
| 3,993,152 | A * | 11/1976 | Fogelberg ............ | B60K 17/344 180/249 |
| 4,103,753 | A * | 8/1978 | Holdeman ................ | F16H 3/54 180/233 |
| 4,119,168 | A * | 10/1978 | Fogelberg .......... | B60K 17/3505 180/248 |
| 4,381,828 | A * | 5/1983 | Lunn ...................... | B60K 17/34 180/247 |
| 5,116,293 | A * | 5/1992 | Reuter ................. | B60K 17/342 403/57 |
| 5,407,024 | A * | 4/1995 | Watson ................ | B60K 17/342 180/197 |
| 5,582,263 | A * | 12/1996 | Varma .................. | B60K 17/344 180/197 |
| 6,808,052 | B2 * | 10/2004 | Kirkwood ............ | B60K 17/344 180/249 |
| 6,830,142 | B2 * | 12/2004 | Weilant .................. | B60K 17/02 180/247 |

(Continued)

*Primary Examiner* — Joseph Rocca
*Assistant Examiner* — Michael Stabley
(74) *Attorney, Agent, or Firm* — Quinn IP Law (57) ABSTRACT

A transfer case assembly for a vehicle has a one-piece torque-transfer component with both a sprocket portion configured to receive torque and an output flange portion configured to transfer the torque received. The sprocket portion and the output flange portion rotate in unison about a common axis and are axially adjacent one another.

16 Claims, 6 Drawing Sheets

(56) References Cited

U.S. PATENT DOCUMENTS 8,157,072 B2 * 4/2012 Bowen .................... F16D 23/12
  180/247
8,556,057 B2 * 10/2013 Bowen ................ B60K 17/344
  192/70.3

* cited by examiner

VEHICLE TRANSFER CASE ASSEMBLY WITH ONE-PIECE TORQUE-TRANSFER COMPONENT HAVING SPROCKET PORTION AND OUTPUT FLANGE PORTION

TECHNICAL FIELD

The present teachings generally include a transfer case assembly for a vehicle.

BACKGROUND

Some automotive vehicles are equipped with a transfer case assembly that selectively enables a switch from a single driven axle to two driven axles. For example, some rear-wheel drive vehicles have a transfer case assembly that can selectively direct some of the drive torque to the front wheels in addition to the rear wheels, establishing an all-wheel drive mode or a four-wheel drive mode.

SUMMARY

A transfer case assembly for a vehicle is provided that has a one-piece torque-transfer component with both a sprocket portion configured to receive torque and an output flange portion configured to transfer the torque received. The sprocket portion and the output flange portion rotate in unison about a common axis and are axially adjacent one another.

The transfer case assembly may include a bearing in an inner cavity defined by an inner annular surface of the sprocket portion. The bearing interfaces with the sprocket portion at the inner annular surface. In one embodiment, the inner cavity extends axially through the sprocket portion and the output flange portion such that the one-piece torque-transfer component is hollow. In such an embodiment, for example, the one-piece torque-transfer component may be powdered metal.

In an embodiment, a transfer case housing radially surrounds the one-piece torque-transfer component. A support post extends from the transfer case housing into the inner cavity. The bearing is supported on the support post in the inner cavity and interfaces with the sprocket portion at the inner annular surface such that the one-piece torque-transfer component is rotatably supported on the support post by the bearing.

The transfer case assembly may include an annular seal supported on an annular outer surface of the output flange portion. The transfer case housing may have an opening at which the output flange portion is positioned. The annular seal may be supported on the annular outer surface of the output flange portion to surround the opening.

The annular outer surface of the output flange portion may have a diameter less than a diameter of a toothed outer surface of the sprocket portion. In one embodiment, a second bearing may be supported on the annular outer surface of the output flange portion and supported on an axially-extending surface of the transfer case housing such that the second bearing is positioned axially between the transfer case housing and the sprocket portion.

The output flange portion may have an inner surface defining an inner cavity and may include a plurality of bosses extending radially inward at the inner surface into the inner cavity. The bosses may have axially-extending openings for receiving mounting features at the output flange portion. The sprocket portion may radially overlap the bosses to strengthen the one-piece torque-transfer component.

In one aspect of the present teachings, a vehicle includes a drive shaft and a rear propeller shaft having a first axis of rotation and operatively connected to rotate in unison with the drive shaft. The vehicle has a front propeller shaft spaced from and parallel with the drive shaft and the rear propeller shaft and rotatable about a second axis of rotation. The vehicle further includes a transfer case assembly configured to split driving torque of the drive shaft between the rear propeller shaft and the front propeller shaft. The transfer case assembly has a first sprocket coaxial with the drive shaft and selectively engageable therewith. The transfer case assembly also has a one-piece torque-transfer component having a sprocket portion and an output flange portion. The sprocket portion and the output flange portion rotate in unison about the second axis of rotation and are axially adjacent one another. The front propeller shaft is operatively connected to the output flange portion to rotate in unison with the one-piece torque-transfer component. A chain is engaged with the first sprocket and the sprocket portion of the one-piece torque-transfer component for transferring torque from the first sprocket to the sprocket portion of the one-piece torque-transfer component.

The one-piece torque-transfer component enables a reduction in the number of components as well as a reduction of the axial packaging space typically required of a separate output sprocket and mounting flange. In arrangements having a separate output sprocket and mounting flange, an intermediate shaft extends from the output sprocket to the mounting flange. A splined interface is required between the intermediate shaft and the output sprocket, and another splined interface is required between the intermediate shaft and the mounting flange. The elimination of such an intermediate shaft and splined interfaces reduces the number of required components and may also reduce manufacturing costs as secondary machining operations typically required for splined interfaces may be eliminated. The primary manufacturing process for the one-piece torque-transfer component may be near net shape, sufficient for use in production. In one example, the one-piece torque-transfer component may be powdered metal.

The above features and advantages and other features and advantages of the present teachings are readily apparent from the following detailed description of the best modes for carrying out the present teachings when taken in connection with the accompanying drawings.

DETAILED DESCRIPTION

Figure 1:
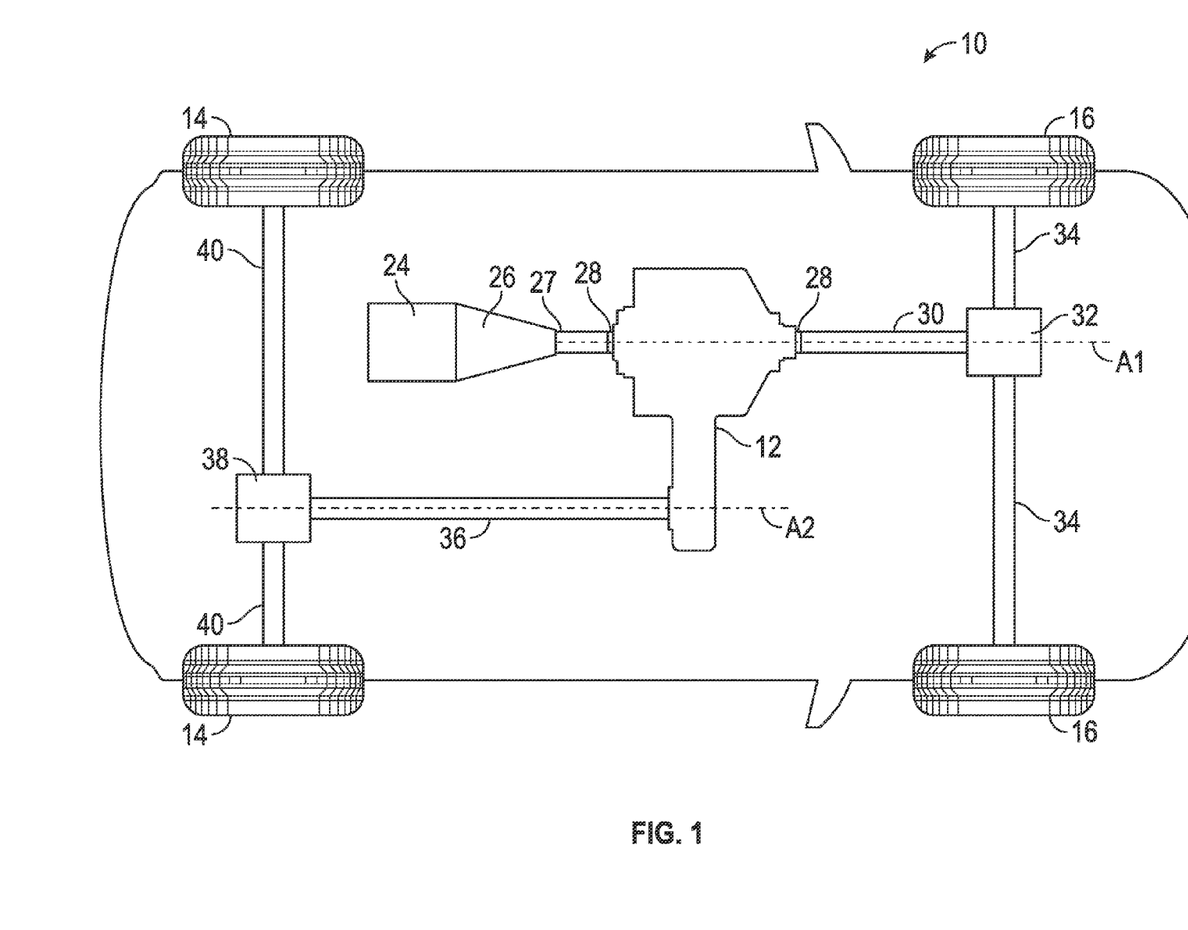
FIG. 1 is a schematic illustration of a vehicle with a transfer case assembly in accordance with the present teachings.

Referring to the drawings, wherein like reference numbers refer to like components throughout the views, FIG. 1 shows a vehicle 10 that has a transfer case assembly 12 operable to selectively split driving torque between a pair of front wheels 14 and a pair of rear wheels 16. As further discussed herein, the transfer case assembly 12 utilizes a compact, one-piece torque-transfer component 18, shown in FIG. 2, which has both a sprocket portion 20 and an output flange portion 22. The combined functions of the single, one-piece torque-transfer component 18 enables space savings, weight reduction, and potential costs savings both in manufacturing and assembly.

The vehicle 10 has an engine 24 that provides driving torque through a transmission 26 to a transmission output shaft 27. The transmission output shaft 27 is coupled to an input drive shaft 28 of the transfer case assembly 12, shown in FIG. 2. The vehicle 10 is a rear-wheel drive vehicle, and a rear propeller shaft 30 is operatively connected to the input drive shaft 28 through the transfer case assembly 12 to rotate in unison with the input drive shaft 28. More specifically, the transmission output shaft 27 is splined to front splines 29 (shown in FIG. 2) of the input drive shaft 28 (shown in FIG. 2), and the rear propeller shaft 30 is splined to the rear splines 31 (shown in FIG. 2) of the input drive shaft 28. The transmission output shaft 27, the input drive shaft 28 and the rear propeller shaft 30 rotate about a first axis of rotation A1 that extends longitudinally in the vehicle 10. The driven rear propeller shaft 30 provides torque to the rear wheels 16 through a rear differential 32 and rear half shafts 34.

A portion of the driving torque can be selectively directed to the front wheels 14 by operation of the transfer case assembly 12 in an all-wheel drive mode or a four-wheel drive mode of the vehicle 10. A front propeller shaft 36 is operatively connected to the transfer case assembly 12 such that it is spaced from and parallel with the drive shaft 28 and the rear propeller shaft 30 and rotatable about a second axis of rotation A2. When selectively driven through the transfer case assembly 12, the front propeller shaft 36 provides torque to the front wheels 14 through a front differential 38 and front half shafts 40.

Figure 2:
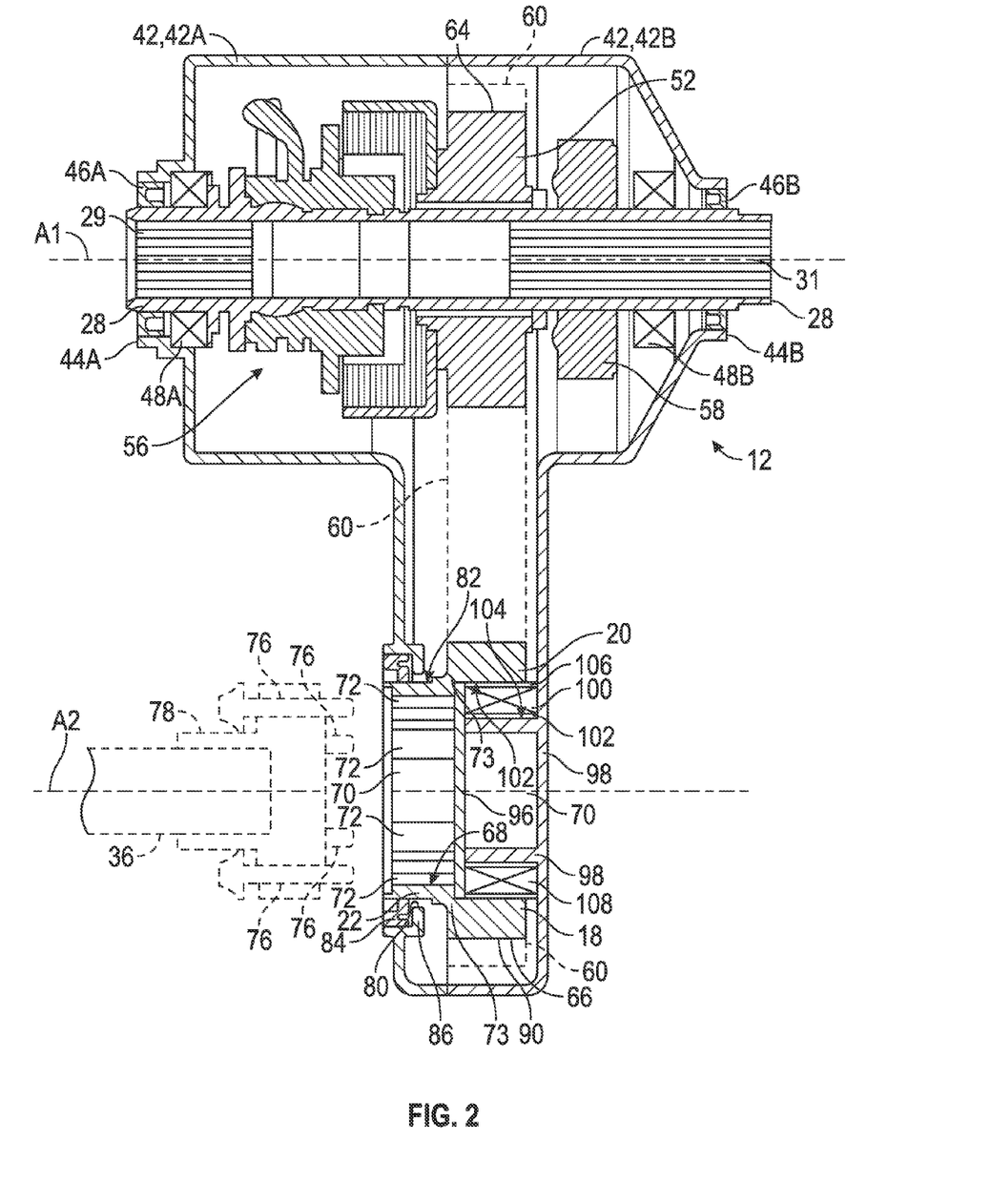
FIG. 2 is a schematic illustration in cross-sectional and partially exploded view of the transfer case assembly of FIG. 1 taken at lines 2-2 in FIG. 3 and with a chain, shown in phantom view, and mounting features and the front propeller shaft shown in fragmented phantom view.

With reference to FIG. 2, the transfer case assembly 12 is shown in greater detail. A transfer case housing 42 includes a front cover 42A and a rear cover 42B. The front and rear covers 42A, 42B are joined to one another by welding or any other suitable manner. The input drive shaft 28 extends through a front opening 44A and a rear opening 44B in the covers 42A, 42B, respectively. Seals 46A, 46B seal the openings 44A, 44B, respectively. Bearings 48A, 48B surround the input drive shaft 28 and enable rotation of the input drive shaft 28 relative to the housing 42.

Figure 3:
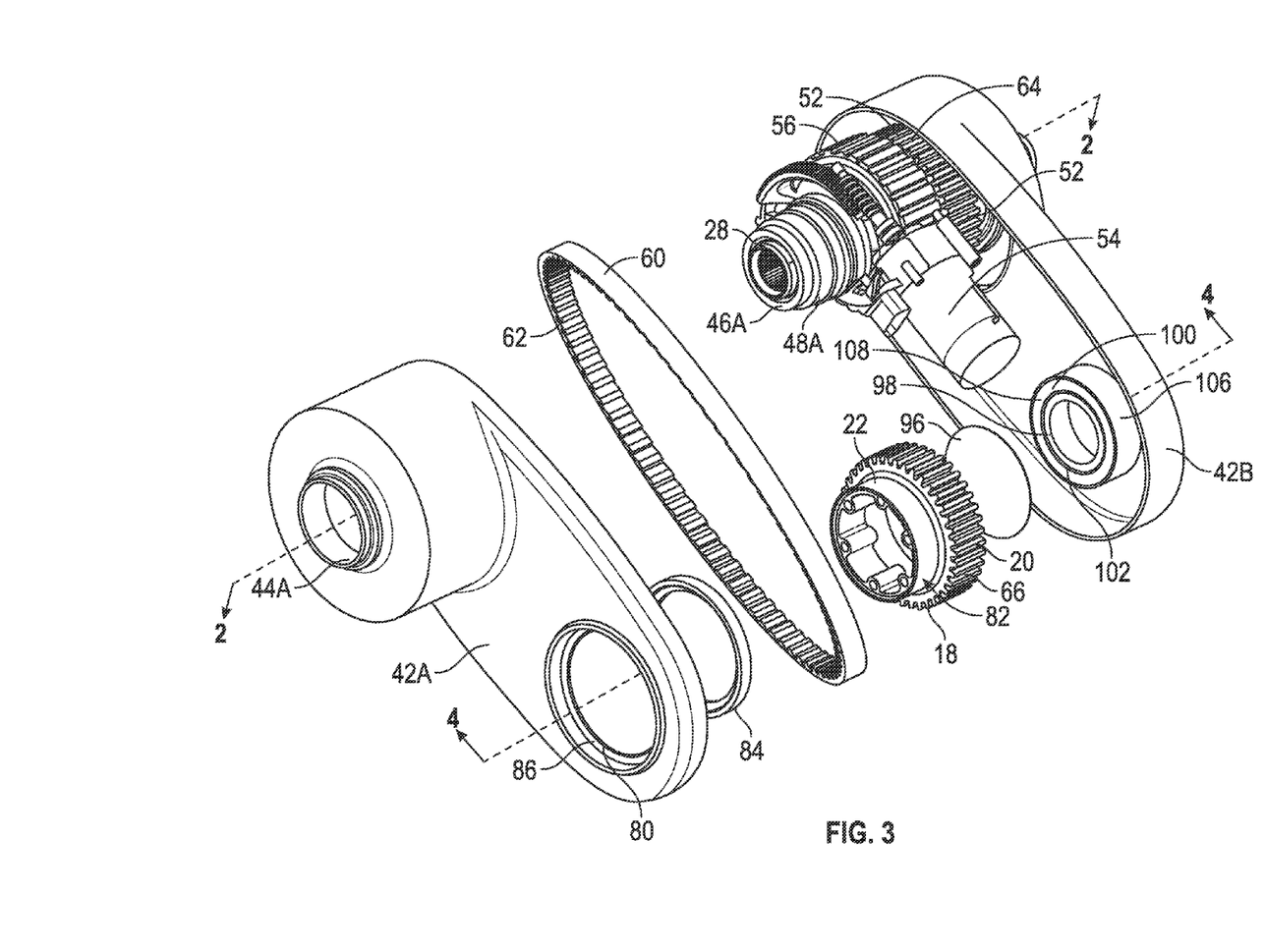
FIG. 3 is a schematic illustration in exploded perspective view of the transfer case assembly of FIG. 2.

A first sprocket 52 is mounted on the input drive shaft 28 such that it is rotatable relative to the input drive shaft 28 in a first, disengaged mode, and can be fixed to rotate in unison with the input drive shaft 28 in a second, engaged mode. An electric motor 54 shown in FIG. 3 is controlled by an electronic control module (not shown) to actuate and engage a clutch mechanism 56 that engages the first sprocket 52 to the input drive shaft 28 to rotate in unison (i.e., at the same speed as the input drive shaft 28. The electronic control module may be mounted anywhere on the vehicle 10 and operatively connected to the electric motor 54. The electronic control module may include multiple interconnected controllers, such as an engine controller and a transmission controller. The electronic control module sends control signals to the motor 54 based on operator input, such as selection of an all-wheel drive mode, and based on sensor information from speed sensors that may be mounted to the transmission output shaft 27, the input drive shaft 28, the front and rear propeller shafts 30, 36, or elsewhere on the vehicle 10. A lubrication pump 58 is mounted to the input drive shaft 28.

A chain 60 shown in FIG. 3 and represented in phantom in FIG. 2 has inner teeth 62 that are engaged with outer teeth 64 of the first sprocket 52 and outer teeth 66 of the sprocket portion 20 of the one-piece torque-transfer component 18. The chain 60 thereby transfers torque from the first sprocket 52 to the sprocket portion 20 of the one-piece torque-transfer component 18. The sprocket portion 20 and the output flange portion 22 rotate in unison about the second axis of rotation A2 and are axially adjacent one another. In other words, the sprocket portion 20 and the output flange portion 22 are rigidly fixed to one another as portions of the same, single component and therefore must rotate together at the same speed.

Figure 5:
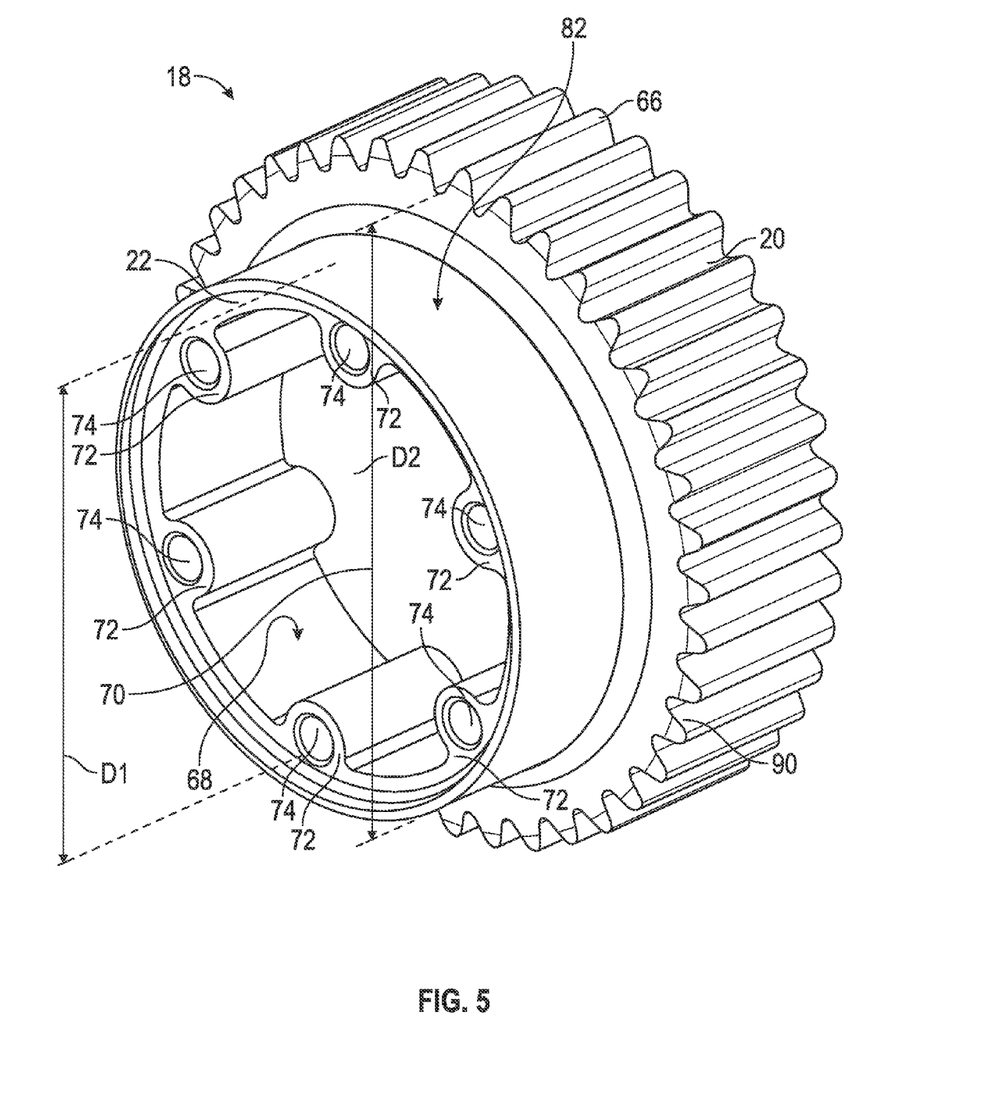
FIG. 5 is a schematic perspective illustration of a one-piece torque-transfer component of the transfer case assembly of FIGS. 1-4.

The front propeller shaft 36 is operatively connected to the output flange portion 22 to rotate in unison with the one-piece torque-transfer component 18. More specifically, as shown in FIGS. 2 and 5, the output flange portion 22 has an annular inner surface 68 defining an inner cavity 70. A plurality of bosses 72 extend radially inward from the inner surface 68 into the inner cavity 70. The bosses 72 have axially-extending openings 74 for receiving mounting features 76 secured to a flange 78 of the front propeller shaft 36 (as shown in phantom in FIG. 2) to mount the output flange portion 22 to the front propeller shaft 36. As is apparent in FIG. 2, the sprocket portion 20 radially overlaps the bosses 72 at a midportion 73 of the one-piece torque-transfer component 18, thus increasing the strength of the component 18. In other words, a cross section taken perpendicular to the axis of rotation A2 through the one-piece torque-transfer component 18 would extend through both the sprocket portion 20 and the output flange portion 22 at the midportion 73.

The output flange portion 22 is positioned at an opening 80 in the front cover 42A so that the openings 74 of the bosses 72 are exposed at the opening 80 to provide access for the mounting features 76. The output flange portion 22 has an annular outer surface 82 that supports an annular seal 84. The front cover 42A of the transfer case housing 42 has a radially inward-extending flange 86 at the opening 80. The annular seal 84 is supported on and surrounds the annular outer surface 82 at the opening 80. The annular outer surface 82 has a diameter D1 that is less than a diameter D2 of a toothed surface 90 of the sprocket portion 20 at the roots of the outer teeth 66 of the sprocket portion 20.

When assembled as shown in FIG. 2, the transfer case housing 42 radially surrounds the one-piece torque-transfer component 18. The inner cavity 70 extends through both the output flange portion 22 and the sprocket portion 20. The one-piece torque-transfer component 18 is thus entirely hollow, which enables it to be manufactured as a powdered metal component with relatively simple tooling. In other words, the generally annular and hollow shape of the one-piece torque-transfer component 18 is a shape suitable for manufacture as a powdered metal component. To separate the inner cavity 70 such as to prevent lubricant splash from the chain 60 from reaching the inner cavity 70 at the output flange portion 22, a substantially circular plate 96 is positioned in the cavity 70 abutting the output flange portion 22 and closing off ends of the openings 74. The plate 96 can be operatively connected to the one-piece torque-transfer component 18 such as by welding. The plate 96 thus rotates with the one-piece torque-transfer component 18.

Figure 4:
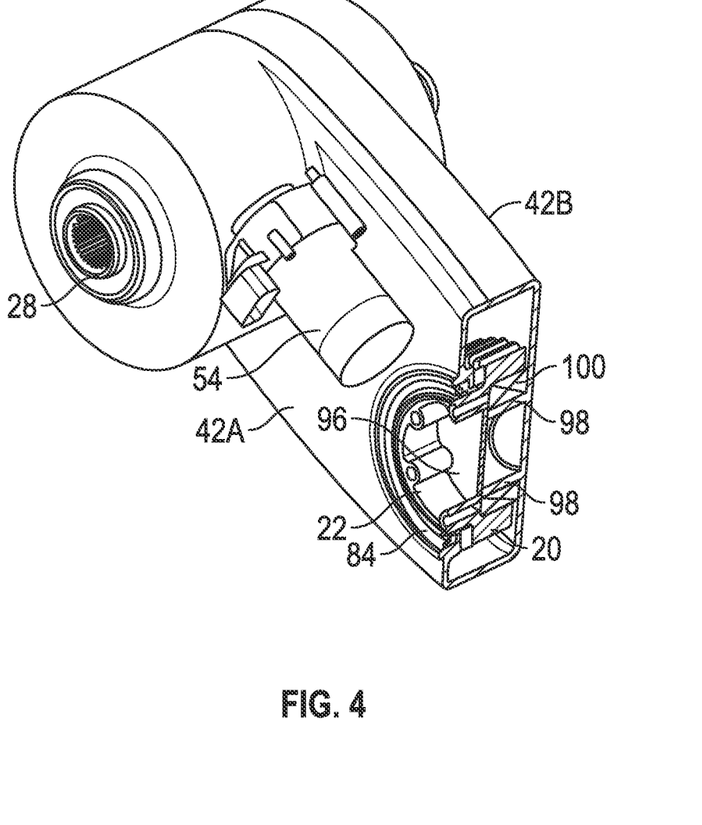
FIG. 4 is a schematic perspective partially cross-sectional illustration taken at lines 4-4 in FIG. 3.

An annular support post 98 extends from and may be integrally formed with the rear cover 42B of the transfer case housing 42 into the inner cavity 70. The rear cover 42B does not have an opening at the support post 98, and the one-piece torque-transfer component 18 is thus enclosed on one axial end by the rear cover 42B. As shown in FIGS. 2 and 4, the support post 98 is generally annular and supports a bearing 100, referred to herein as a first bearing. The bearing 100 has an inner race 102 supported on an annular outer surface 104 of the support post 98 as shown in FIG. 2. An outer race 106 of the bearing 100 interfaces with an inner annular surface 102 of the sprocket portion 20. Roller elements 108 are packaged between the races 102, 106. The one-piece torque-transfer component 18 is thus rotatably supported on the support post 98 by the bearing 100.

When assembled, the transfer case assembly 12 is very compact due to the one-piece torque-transfer component 18. The components of the transfer case assembly 12 are stacked in axial order as shown in FIG. 2 as seal 84, radially-inward extending flange 86 of the front cover 42A, sprocket portion 20, and rear cover 42B. The output flange portion 22 is radially aligned with the seal 84, and the first bearing 100 and the support post 98 are radially aligned with the sprocket portion 20.

Figure 6:
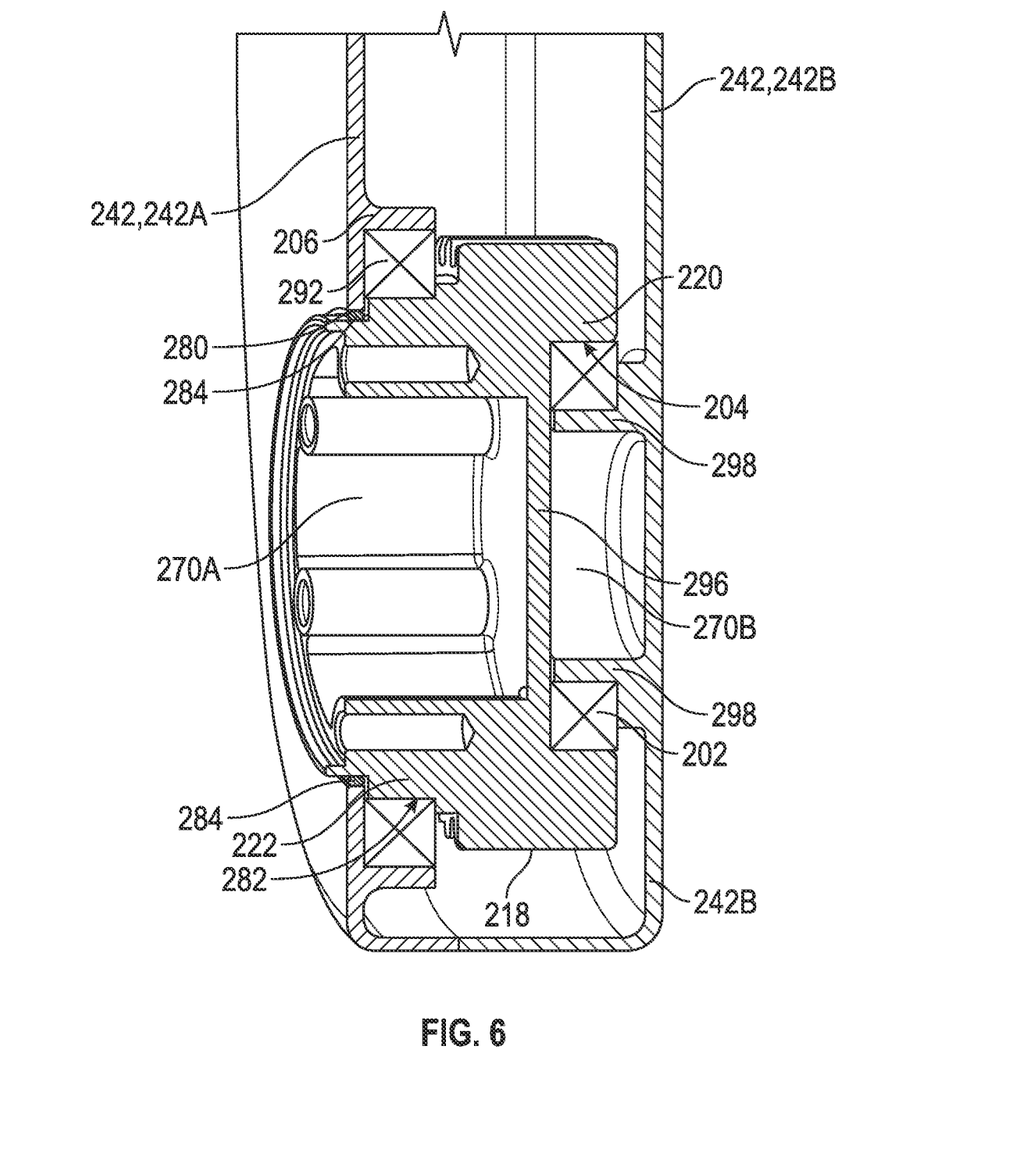
FIG. 6 is a schematic illustration in fragmentary cross-sectional view of an alternative embodiment of a transfer case assembly for a vehicle in accordance with an alternative aspect of the present teachings

FIG. 6 shows another embodiment of a torque-transfer component 218 that has a sprocket portion 220 and an output flange portion 222. The torque-transfer component 218 is substantially identical to the torque-transfer component 18 except that the sprocket portion 220 has an integral plate portion 296 that separates the inner cavity 270A formed by the output flange portion 222 from the inner cavity 270B formed by the sprocket portion 220. Accordingly, the torque-transfer component 218 is not entirely hollow.

A bearing 202 supports the sprocket portion 220 at an inner annular surface 204 of the sprocket portion 220. An integral annular support post 298 of a rear cover 242B of the transfer case housing 242 supports the bearing 202 and in turn supports the one-piece torque-transfer component 218. Another bearing 292 interfaces with an axially-extending annular outer surface 282 of the output flange portion 222. The bearing 292 is supported by an axially-extending annular flange 206 of the front cover 242A of the transfer case housing 242. A seal 284 is supported on the annular outer surface 282 of the output flange portion 222 at the opening 280 in the front cover 242A of the transfer case housing 242.

The one-piece torque-transfer component 18 and the one-piece torque-transfer component 218 enable a reduction in axial packaging space typically required of a separate output sprocket and mounting flange. In such arrangements, an intermediate shaft extends from the output sprocket to the mounting flange. A splined interface is required between the intermediate shaft and the output sprocket, and another splined interface is required between the intermediate shaft and the mounting flange. The elimination of such an intermediate shaft and splined interfaces enabled by the one-piece torque-transfer component 18 or 218 reduces the number of required components and may also reduce manufacturing costs as secondary machining operations typically required for splined interfaces may be eliminated. The primary manufacturing process for the one-piece torque-transfer component 18 and the one-piece torque-transfer component 218 may be near net shape, sufficient for use in production.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A transfer case assembly for a vehicle, the transfer case assembly comprising:
a one-piece torque-transfer component having a sprocket portion configured to receive torque and an output flange portion configured to transfer the torque received; and
wherein the sprocket portion and the output flange portion rotate in unison about a common axis and are axially adjacent one another;
wherein the output flange portion has an inner surface defining an inner cavity;
wherein the output flange has a plurality of bosses extending radially inward at the inner surface into the inner cavity; and
wherein the bosses have axially-extending openings for receiving mounting features at the output flange portion.

2. The transfer case assembly of claim 1, wherein the sprocket portion has an inner annular surface defining an inner cavity; and further comprising:
a bearing in the inner cavity interfacing with the sprocket portion at the inner annular surface.

3. The transfer case assembly of claim 1, wherein the output flange portion has an outer surface, and further comprising:
an annular seal supported on the outer surface of the output flange portion.

4. The transfer case assembly of claim 1, wherein the sprocket portion radially overlaps the plurality of bosses.

5. The transfer case assembly of claim 1, wherein the one-piece torque-transfer component has an inner cavity extending axially through the sprocket portion and the output flange portion such that the one-piece torque-transfer component is hollow.

6. The transfer case assembly of claim 5, wherein the one-piece torque-transfer component is powdered metal.

7. The transfer case assembly of claim 5, further comprising:
a plate operatively connected to the one-piece torque-transfer component within the inner cavity; and
wherein the plate closes the inner cavity.

8. The transfer case assembly of claim 1, wherein the sprocket portion has an inner annular surface defining an inner cavity; and further comprising:
a transfer case housing radially surrounding the one-piece torque-transfer component;
a support post extending from the transfer case housing into the inner cavity;
a bearing supported on the support post in the inner cavity and interfacing with the sprocket portion at the inner annular surface such that the one-piece torque-transfer component is rotatably supported on the support post by the bearing.

9. The transfer case assembly of claim 8, wherein the transfer case housing has an opening at which the output flange portion is positioned; wherein the output flange portion has an annular outer surface; and further comprising:

an annular seal supported on and surrounding the annular outer surface of the output flange portion at the opening.

10. The transfer case assembly of claim 8, wherein the bearing is a first bearing; wherein the transfer case housing has an axially-extending flange; wherein the sprocket portion has a toothed outer surface; wherein the output flange portion has an axially-extending outer surface with a diameter less than a diameter of the toothed outer surface of the sprocket portion; and further comprising:
   a second bearing supported on the annular outer surface of the output flange portion and the axially-extending flange of the transfer case housing such that the second bearing is positioned radially between the transfer case housing and the sprocket portion.

11. A transfer case assembly comprising:
   a one-piece torque-transfer component having a sprocket portion configured to receive torque and an output flange portion configured to transfer the torque received; wherein the sprocket portion and the output flange portion rotate in unison about a common axis and are axially adjacent one another; wherein the sprocket portion has an annular inner surface defining an inner cavity;
   a transfer case housing radially surrounding the one-piece torque-transfer component;
   a support post extending from the transfer case housing into the inner cavity;
   a bearing supported on the support post in the inner cavity and interfacing with the sprocket portion at the annular inner surface such that the one-piece torque-transfer component is rotatably supported on the support post by the bearing;
   wherein the output flange portion has an annular outer surface; and
   an annular seal supported on the annular outer surface of the output flange portion.

12. The transfer case assembly of claim 11, wherein the transfer case housing has an opening and an axially-extending flange at the opening; wherein the output flange portion has an annular outer surface; and wherein the annular seal is supported on the axially-extending flange of the transfer case housing and surrounds the opening.

13. The transfer case assembly of claim 11, wherein the one-piece torque-transfer component has an inner cavity extending axially through the sprocket portion and the output flange portion such that the one-piece torque-transfer component is hollow; and further comprising:
   a plate operatively connected to the one-piece torque-transfer component within the inner cavity; and
   wherein the plate closes the inner cavity.

14. A transfer case assembly for a vehicle, the transfer case assembly comprising:
   a one-piece torque-transfer component having a sprocket portion configured to receive torque and an output flange portion configured to transfer the torque received;
   wherein the sprocket portion and the output flange portion rotate in unison about a common axis and are axially adjacent one another;
   wherein the sprocket portion has an inner annular surface defining an inner cavity; and further comprising:
   a bearing in the inner cavity interfacing with the sprocket portion at the inner annular surface.

15. The transfer case assembly of claim 14, wherein the one-piece torque-transfer component is powdered metal.

16. The transfer case assembly of claim 14, wherein the output flange portion has an outer surface, and further comprising:
   an annular seal supported on the outer surface of the output flange portion.

* * * * *